(12) United States Patent
Puchleitner et al.

(10) Patent No.: US 11,565,455 B2
(45) Date of Patent: Jan. 31, 2023

(54) METHOD OF PRODUCING A HOLLOW BODY

(71) Applicant: MAGNA Energy Storage Systems GesmbH, Sinabelkirchen (AT)

(72) Inventors: Rainer Puchleitner, Graz (AT); David Puntigam, Gross St. Florian (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/542,443

(22) Filed: Dec. 5, 2021

(65) Prior Publication Data

US 2022/0219372 A1 Jul. 14, 2022

(30) Foreign Application Priority Data

Jan. 13, 2021 (EP) ..................................... 21151276

(51) Int. Cl.
*B29C 49/20* (2006.01)
*B29C 49/24* (2006.01)
(Continued)

(52) U.S. Cl.
CPC .............. *B29C 49/20* (2013.01); *B29C 49/24* (2013.01); *B29C 2049/2065* (2013.01);
(Continued)

(58) Field of Classification Search
CPC .... B29C 2049/2443; B29C 2049/2404; B29C 2049/2095; B29C 2049/2065; B29C 49/24; B29C 49/20; B29L 2031/7172
See application file for complete search history.

(56) References Cited

U.S. PATENT DOCUMENTS

| 5,819,978 A | 10/1998 | Hlebovy |
| 9,227,356 B2 | 1/2016 | Tani et al. |

(Continued)

FOREIGN PATENT DOCUMENTS

| DE | 102014009341 A1 | 12/2015 | |
| KR | 20090121761 A * | 11/2009 | ............. B29C 43/04 |
| WO | 2013008719 A1 | 1/2013 | |

OTHER PUBLICATIONS

Machine translation of KR 20090121761 A dated Nov. 26, 2009. (Year: 2009).*

(Continued)

*Primary Examiner* — Robert B Davis
(74) *Attorney, Agent, or Firm* — Jordan IP Law, LLC; Todd A. Vaughn

(57) ABSTRACT

A method for producing a hollow body for storing gases, the hollow body including at least one boss part having a projection. The method includes providing a sheathing composed of a plastic material or a reactive material, over the at least one boss part, at least in a region of the projection. The sheathed at least one boss part is then heated and introduced into a blow mould, where it is surrounding with a plastic tube to form the hollow body. The plastic tube is then brought into permanent contact with the sheathing on the projection to thereby obtain a permanent material connection between the plastic of the plastic tube to the plastic or the reactive material of the sheathing. An internal pressure is then applied to the plastic of the plastic tube to obtain a final shape of the hollow body.

18 Claims, 4 Drawing Sheets

(51) Int. Cl.
  *B29L 9/00* (2006.01)
  *B29L 31/00* (2006.01)
(52) U.S. Cl.
  CPC ............ *B29C 2049/2095* (2013.01); *B29C 2049/2404* (2013.01); *B29C 2049/2443* (2013.01); *B29L 2009/00* (2013.01); *B29L 2031/7172* (2013.01)

(56) References Cited

U.S. PATENT DOCUMENTS

| | | |
|---|---|---|
| 2011/0220660 A1 | 9/2011 | Strack |
| 2011/0260369 A1* | 10/2011 | Klofta ................ B29C 49/22 264/458 |
| 2015/0167893 A1 | 6/2015 | Nishimoto et al. |
| 2018/0149312 A1 | 5/2018 | Criel et al. |

OTHER PUBLICATIONS

European Search Report for EPO Patent Application No. 21151276.99, dated Jun. 21, 2021, 4 pages.

* cited by examiner

METHOD OF PRODUCING A HOLLOW BODY

CROSS-REFERENCE TO RELATED APPLICATIONS

The present application claims priority under 35 U.S.C. § 119 to European Patent Publication No. EP 21151276.9 (filed on Jan. 13, 2021), which is hereby incorporated by reference in its complete entirety.

TECHNICAL FIELD

Embodiments relate to a method for producing a hollow body for storing gases.

BACKGROUND

It is known that hollow bodies for storing gases, which may in particular form high-pressure containers, e.g., for storing hydrogen as a fuel for motor vehicles, can be constructed from an inner layer, referred to as the "liner", and a winding of fibre material around the liner.

The use of the technologies of blow moulding and thermoforming for the production of a container is known. Production is then based on the forming of semi-finished products in tube or sheet form. These are given their final shape via a vacuum and/or excess pressure. It is possible, for example, to produce two half-shells, which are joined together to form a container.

In the case where gas-tight liners are used for type IV containers, which are used for the pressurized storage of gases, there are two common production methods. On the one hand, the blow moulding of entire liners and, on the other hand, the method of producing segments of the container by injection moulding and extrusion, and subsequent connection of these components via a joining method.

The materials used in this process are mostly based on HDPE (high density polyethylene) or polyamides.

An important distinguishing feature for liner materials are the mechanical low-temperature properties as well as the emission properties. Monolayer materials such as polyamide have a good barrier property for gases, but do not have optimum low-temperature properties. HDPE, on the other hand, does not have a suitable barrier effect, but has very good low-temperature properties.

For this reason, it is principally polyamide that is currently being used specifically for applications in the hydrogen sector. However, this imposes limits with regard to component size, especially for blow moulding technology. Moreover, the available suitable grades are expensive and problematic when used at low temperatures because of their extensive use of additives.

High-pressure containers for gases are subject to large temperature fluctuations in the course of their operation (filling, storage and emptying). This puts high demands on the materials and, in particular, on the liner.

In connection with the lightweight construction and use of composite materials, the challenge arises in this context of connecting the different materials to one another in a gas-tight manner at the joint.

SUMMARY

In accordance with one or more embodiments, a method for producing a hollow body for storing gases is provided which can be carried out in a simple and inexpensive manner and which makes it possible to meet the requirements for leak tightness and permeation for a high-pressure container.

The object is achieved by a method for producing a hollow body for storing gases, wherein the hollow body comprises at least one boss part having a projection, wherein the hollow body is produced by blow moulding, wherein the boss part is sheathed with a plastic or a reactive material as sheathing, at least in a region of the projection, and heated, then the heated, sheathed boss part is introduced into a blow mould and is surrounded by a plastic tube to form the hollow body, then the plastic tube is brought permanently into contact with the sheathing on the projection of the boss part, with the result that the plastic of the plastic tube is permanently materially connected to the plastic or the reactive material of the sheathing, wherein the plastic of the plastic tube is given its final shape of the hollow body by applying an internal pressure.

In accordance with one or more embodiments, a boss part, which can preferably consist of metal, is incorporated in a leak tight manner into a plastic which forms the container wall, in particular, into a "liner" of the container, in that the boss part is covered with a suitable plastic material or reactive material, being overmoulded and thus sheathed, and heated, for example, even before being connected to the container wall. The warm or hot plastic or reactive material of the boss part can then enter into a good material connection with the plastic which forms the container wall. For this purpose, the plastic tube is brought permanently into contact with the sheathing plastic or reactive material on the projection of the boss part, being pressed together for example. This connection of a boss part to the liner of the container can ensure a high leak tightness, preferably also impermeability, with respect to an undesired escape of gas, and can nevertheless be produced in a simple and inexpensive manner.

In this context, a "reactive material" is a material which, at least after it has been heated, can enter into a material connection with the plastic of the plastic tube which forms the hollow body. The reactive material or the sheathing plastic can be in the form of a coating, for example.

The hollow body produced preferably has a substantially cylindrical shape. The "projection" is preferably an axial section of the boss part with a larger diameter than other axial sections of the boss part and preferably extends approximately normal to a longitudinal axis of the boss part and/or to a longitudinal axis of the container produced.

The plastic tube is preferably brought permanently into contact with the sheathing at least on an outer side of the projection of the boss part facing away from the container interior.

The plastic tube can be brought permanently into contact with the sheathing on the projection of the boss part by an axial lifting movement of the boss part relative to the blow mould.

The plastic tube is preferably brought permanently into contact with the sheathing on the projection of the boss part in such a way that the projection of the boss part is brought to a defined proximity relative to the blow mould, that is to say is moved or pressed so close that the two plastics or materials, the boss part on the one hand and the container wall on the other hand, are pressed together to a desired extent.

The boss part can be sheathed with the sheathing by overmoulding the boss part. In general, the sheathing can be carried out by coating. The sheathing, coating and/or overmoulding can take place at least in one region of the projection, preferably at least in one region on the outer side of the projection of the boss part.

The boss part preferably has a surface which is prepared for the adhesion of the plastic of the sheathing, in particular a surface which is porous.

Preferably, after the sheathed boss part has been introduced into the blow mould and the boss part has been surrounded by the plastic tube to form the hollow body, the blow mould is closed, in particular two mould halves, can be closed, wherein the plastic tube is preferably already brought into contact, at least partially and/or at least temporarily, optionally also permanently, with the sheathing on the projection of the boss part by the closing of the blow mould.

The application of the internal pressure to give the plastic of the plastic tube its final shape of the hollow body can be carried out after the plastic tube has been brought permanently into contact with the sheathing on the projection of the boss part. Alternatively or additionally, the application of the internal pressure to give the plastic of the plastic tube its final shape of the hollow body can be carried out even before the plastic tube has been brought permanently into contact with the sheathing on the projection of the boss part.

The blow mould preferably comprises two mould halves and a blowing mandrel, wherein the sheathed boss part is mounted on the blowing mandrel of the blow mould and the plastic tube is extruded between the mould halves and around the blowing mandrel in order to surround the boss part.

The plastic tube preferably consists of an impermeable multilayer plastic and preferably comprises at least one barrier layer for gases, such as hydrocarbons.

The plastic of the plastic tube can preferably comprise high density polyethylene (HDPE).

After the application of the internal pressure to give the plastic of the plastic tube its final shape of the hollow body, the plastic of the hollow body is preferably wrapped with a fibre composite material in order to give the container a high mechanical strength. The fibre composite material can preferably contain carbon fibres, glass fibres and/or epoxy resin.

DRAWINGS

Embodiments will be illustrated by way of example in the drawings and explained in the description hereinbelow:

DESCRIPTION

FIGS. 1 through 4 illustrate steps (performed in chronological sequential order) of a method for producing a hollow body, in accordance with one or more embodiments. In this context, the use of a sheathing plastic is described as sheathing. It is also possible, however, to use a reactive layer as sheathing.

Figure 1:
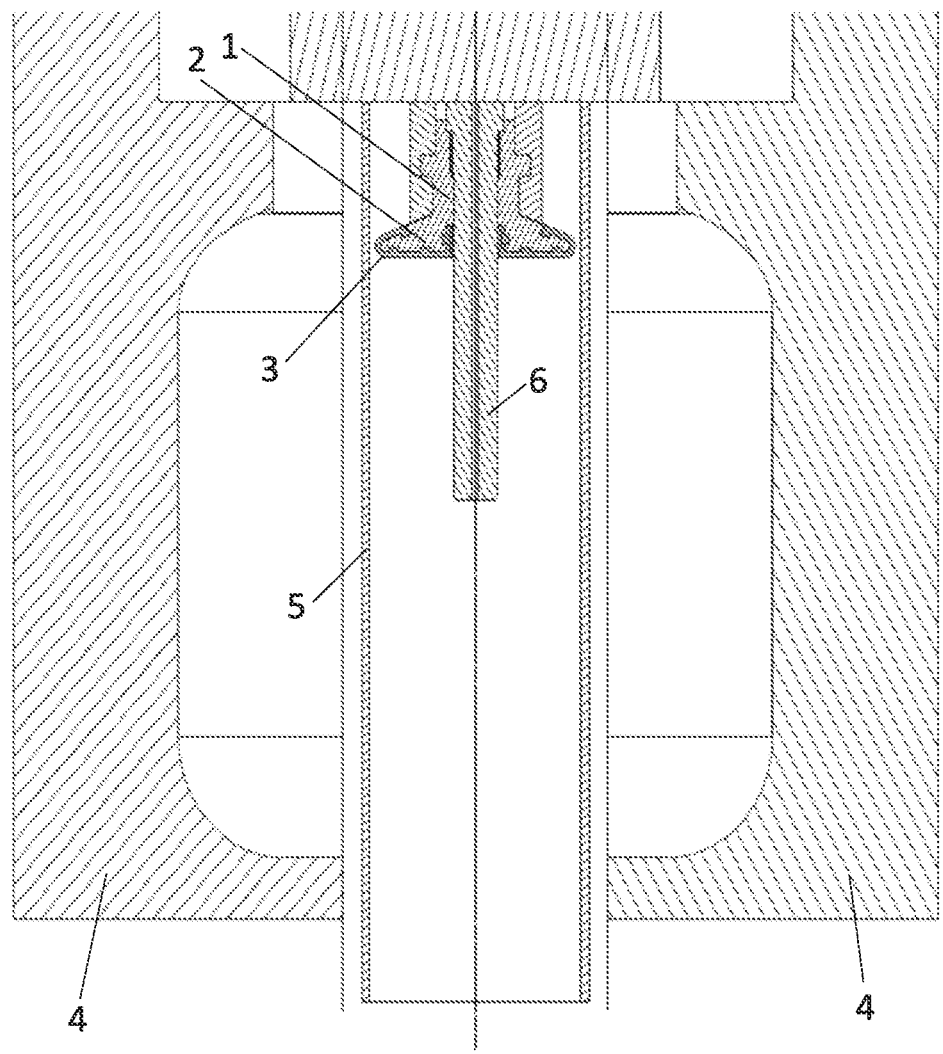
FIG. 1 illustrates a schematic sectional view of a first step in a method for producing a hollow body, in accordance with one or more embodiments.

FIG. 1 illustrates how a heated insert part, namely, a boss part 1 with a projection 2 at a foot end of the boss part 1 facing the interior of the subsequent container, the boss part 1 being sheathed in the region of the projection 2 with a plastic as sheathing 3, was fastened to a blowing mandrel 6 of a blow mould 4 and brought into position manually or by a suitable automated device.

In addition to the central blowing mandrel 6, the blow mould 4 also comprises two mould halves, which form mould halves for shaping the hollow body. In FIG. 1, the mould halves are initially in the open position. A plastic tube 5 is discharged, in particular, extruded, into the opened blow mould 4.

Figure 2:
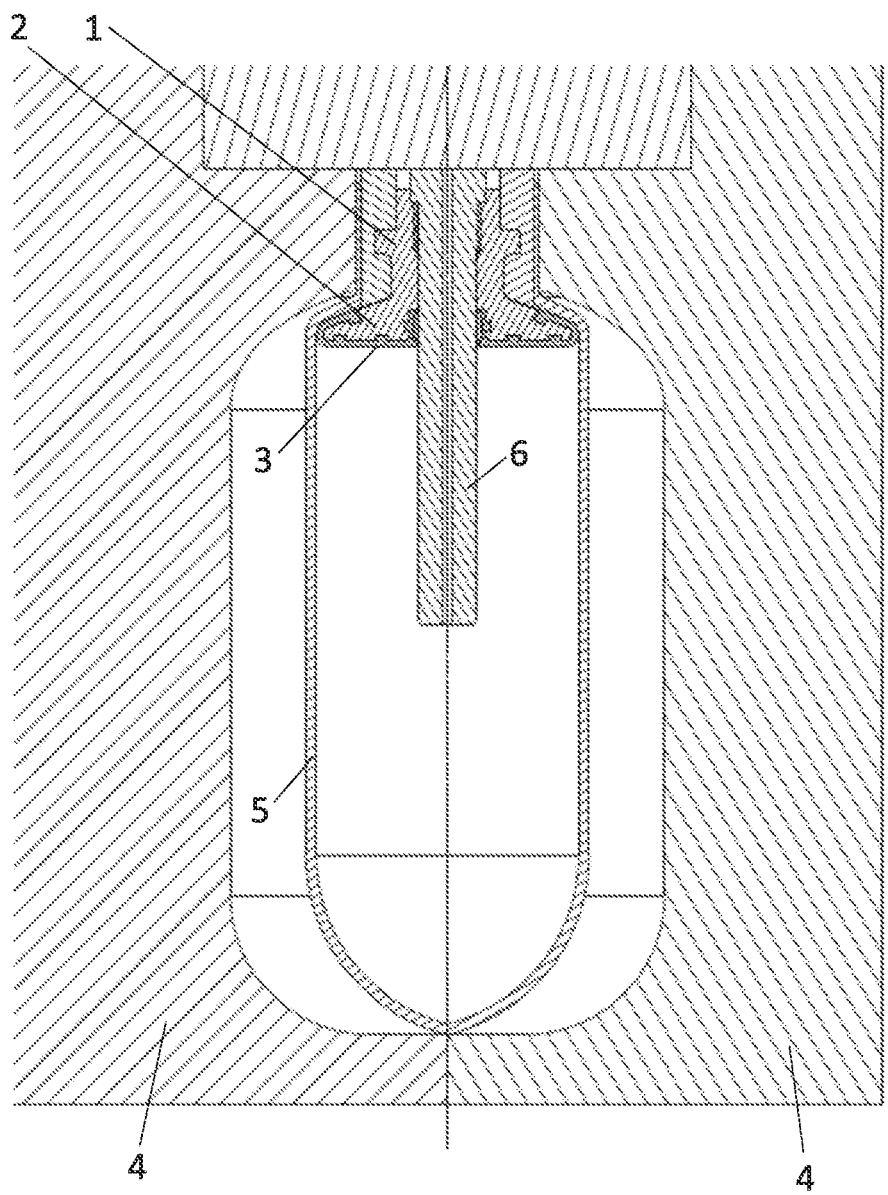
FIG. 2 illustrates a schematic sectional view of a second step in a method for producing a hollow body, in accordance with one or more embodiments.

FIG. 2 illustrates that the mould halves of the blow mould 4 have been closed. Here, the plastic tube 5 already bears roughly against the outer contour of the boss part 1, in particular, against the outer side of the projection 2, in the upper region of the boss part 1. The plastic tube 5 is brought into contact at least partially and/or at least temporarily, or even already permanently, with the sheathing plastic 3 on the projection 2 of the boss part 1.

Figure 3:
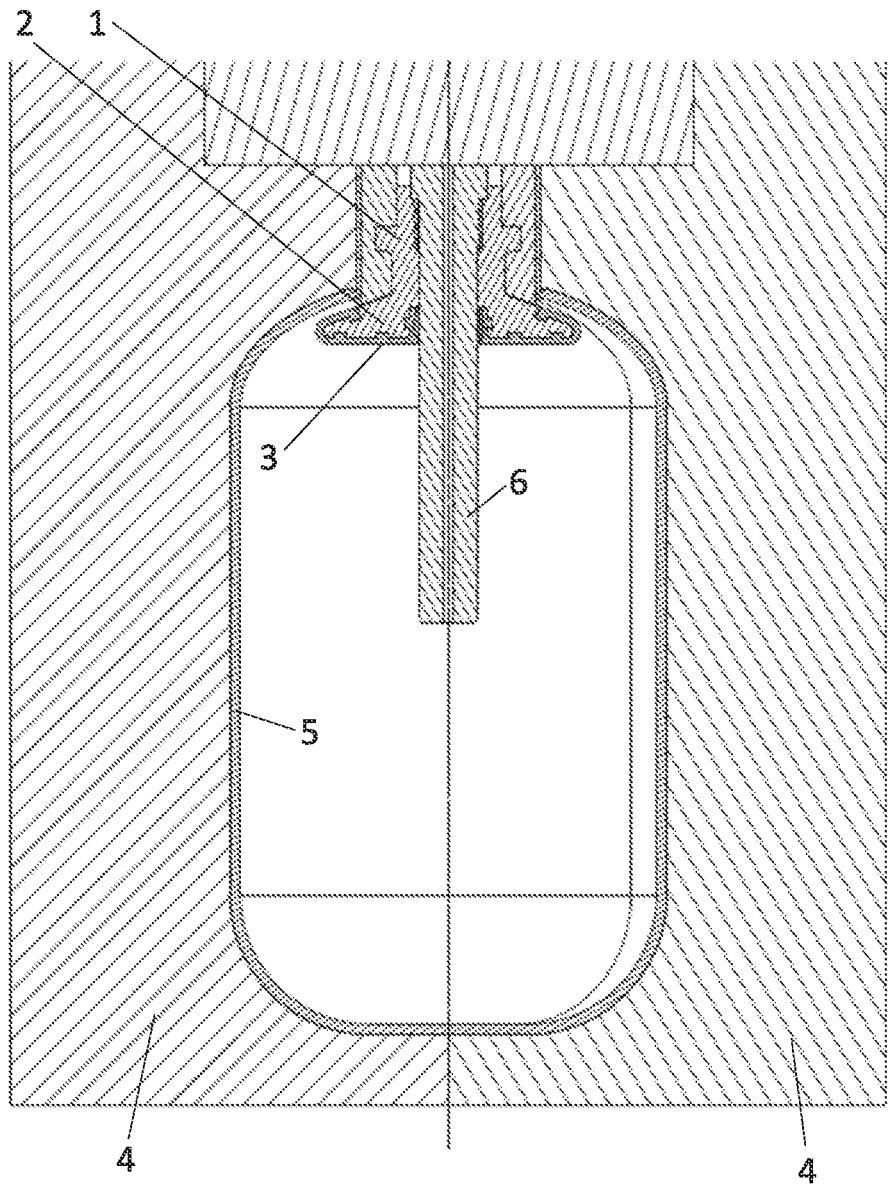
FIG. 3 illustrates a schematic sectional view of a third step in a method for producing a hollow body, in accordance with one or more embodiments.

In a next step, as illustrated in FIG. 3, the plastic of the plastic tube 5 can be pressed against the shape of the closed blow mould 4 by blow moulding in order to bring the latter already, at least approximately, into the shape of the desired hollow body. During this process, the plastic of the plastic tube 5 may possibly be at least partially detached again from the sheathing plastic 3 on the projection 2 of the boss part 1.

Figure 4:
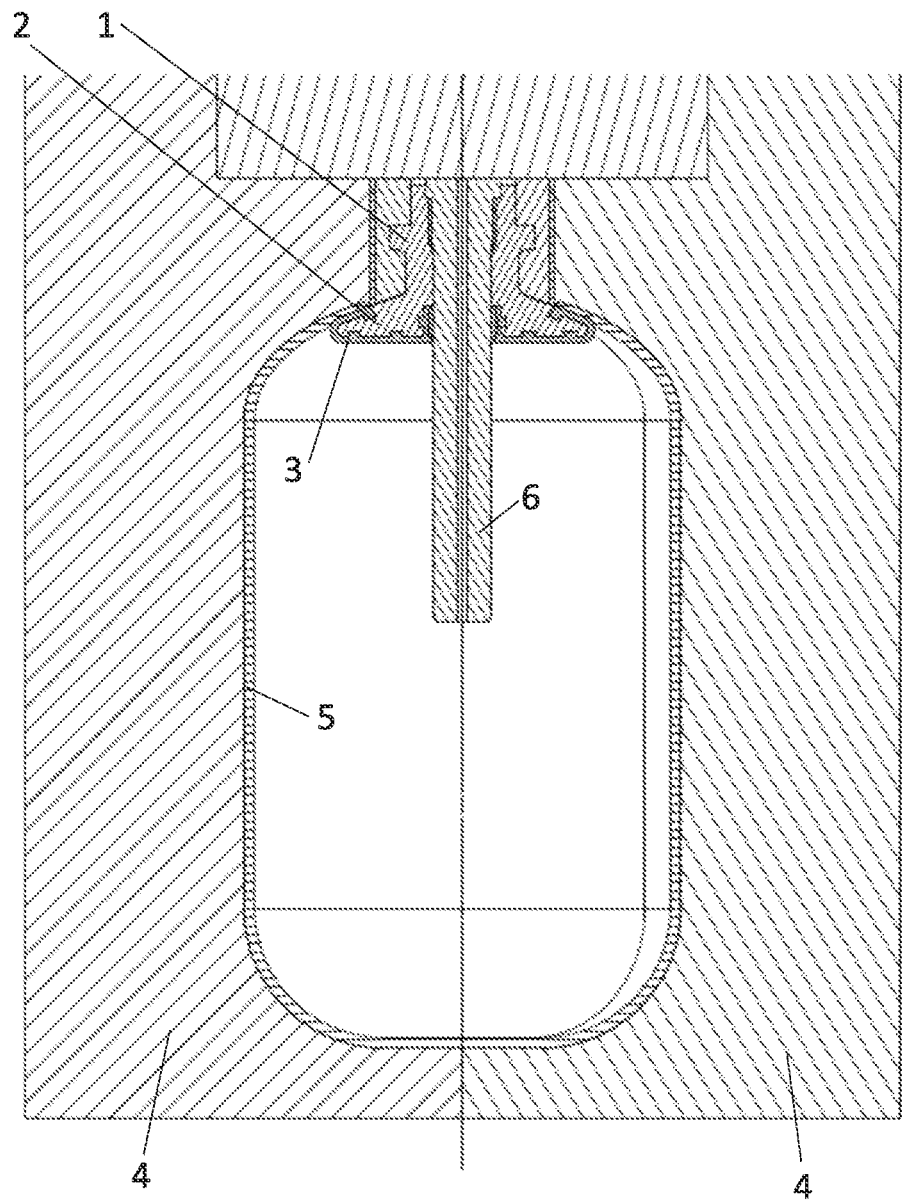
FIG. 4 illustrates a schematic sectional view of a fourth step in a method for producing a hollow body, in accordance with one or more embodiments.

As illustrated in FIG. 4, the boss part 1, in particular, the plastic overmoulding 3, and the plastic tube 5 are compressed to a defined cross-section on the outer side of the projection 2 via a vertical stroke of the boss part 1 relative to the outer mould, that is to say to the mould halves of the blow mould 4. During this process, a permanent material connection is brought about between the overmoulding 3 of the boss part 1 and the tube 5 in the compressed region.

After compression and welding have been carried out in the upper region of the boss part 1, the liner, i.e., the plastic tube 5, is given its final shape by applying an internal pressure.

The step described in FIG. 3 can also be omitted, such that the application of an internal pressure to the plastic tube 5 to give the latter the shape of the desired hollow body takes place only once, namely after the pressing together of the plastic 3, which sheaths the boss part 1, with the plastic tube 5. Alternatively, the application of the internal pressure can also begin even before pressing, for example, and the pressing together of the plastics 3, 5 can take place during the application of the internal pressure, i.e., during blow moulding, for example.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 boss part
2 projection 3 sheathing (plastic material or reactive material)
4 blow mould
5 plastic tube
6 blowing mandrel

What is claimed is:

1. A method for producing a hollow body for storing gases, the hollow body including at least one boss part having a projection, the method comprising:
   sheathing the at least one boss part, at least in a region of the projection, with a plastic material;
   heating the sheathed at least one boss part;
   introducing the heated, sheathed at least one boss part into a blow mould, and surrounding the heated, sheathed at least one boss part with a tube composed of a plastic material to form the hollow body;
   bringing the tube into permanent contact with the sheathing on the projection to thereby obtain a permanent material connection between the plastic of the tube and the plastic material of the sheathing; and
   applying, before the tube is brought into permanent contact with the sheathing on the projection, an internal pressure to the plastic of the tube to obtain a final shape of the hollow body.

2. The method of claim 1, wherein bringing the tube into permanent contact with the sheathing comprises bringing the tube into permanent contact with the sheathing at least on an outer side of the projection facing away from the container interior.

3. The method of claim 1, wherein bringing the tube into permanent contact with the sheathing comprises bringing the tube into permanent contact with the sheathing on the projection by performing an axial lifting movement of the at least one boss part relative to the blow mould.

4. The method of claim 1, wherein bringing the tube into permanent contact with the sheathing comprises bringing the projection into a defined proximity relative to the blow mould in a manner such that the plastic of the tube is pressed together with the plastic material of the sheathing.

5. The method of claim 1, wherein sheathing the at least one boss part comprises sheathing the at least one boss part at least in a region of the projection, by overmoulding the at least one boss part.

6. The method of claim 1, wherein the at least one boss part has a porous surface which is prepared for adhesion of the sheathing.

7. The method of claim 1, further comprising closing the blow mould, after introducing the heated, sheathed at least one boss part into the blow mould and surrounding the heated, sheathed at least one boss part with the tube, to thereby bring the tube into contact, at least partially and/or at least temporarily, with the sheathing on the projection.

8. The method of claim 1, wherein the blow mould comprises two mould halves and a blowing mandrel.

9. The method of claim 8, wherein the sheathed at least one boss part is mounted on the blowing mandrel of the blow mould and the tube is extruded between the mould halves and around the blowing mandrel in order to surround the at least one boss part.

10. The method of claim 1, wherein the plastic material of the tube comprises an impermeable multilayer plastic.

11. The method of claim 1, further comprising, after applying the internal pressure to the plastic of the tube, wrapping the hollow body with a fibre composite material.

12. A method for producing a hollow body for storing gases, the hollow body including at least one boss part having a projection, the method comprising:
   sheathing the at least one boss part with a reactive material;
   heating the sheathed at least one boss part;
   introducing the heated, sheathed at least one boss part into a blow mould, and surrounding the heated, sheathed at least one boss part with a tube composed of an impermeable multilayer plastic to form the hollow body;
   bringing the tube into permanent contact with the sheathing on the projection to thereby obtain a permanent material connection between the impermeable multilayer plastic of the tube and the reactive material of the sheathing; and
   applying, before the tube is brought into permanent contact with the sheathing on the projection, an internal pressure to the impermeable multilayer plastic of the tube to obtain a final shape of the hollow body.

13. The method of claim 12, wherein bringing the tube into permanent contact with the sheathing comprises:
   bringing the tube into permanent contact with the sheathing at least on an outer side of the projection facing away from an interior of the hollow body, and
   performing an axial lifting movement of the at least one boss part relative to the blow mould.

14. The method of claim 12, wherein bringing the tube into permanent contact with the sheathing comprises bringing the projection into a defined proximity relative to the blow mould in a manner such that the impermeable multilayer plastic of the tube is pressed together with the reactive material of the sheathing.

15. The method of claim 12, wherein sheathing the at least one boss part comprises sheathing the at least one boss part at least in a region of the projection, by overmoulding the at least one boss part.

16. The method of claim 12, further comprising closing the blow mould, after introducing the heated, sheathed at least one boss part into the blow mould and surrounding the heated, sheathed at least one boss part with the tube, to thereby bring the tube into contact, at least partially and/or at least temporarily, with the sheathing on the projection.

17. The method of claim 12, further comprising, after applying the internal pressure to the impermeable multilayer plastic of the tube, wrapping the hollow body with a fibre composite material.

18. A method for producing a hollow body for storing gases, the method comprising:
   sheathing a boss part having a projection, at least in a region of the projection, with a plastic material;
   heating the sheathed at least one boss part;
   introducing the heated, sheathed at least one boss part into a blow mould, and surrounding the heated, sheathed at least one boss part with a tube composed of a plastic material to form the hollow body;
   applying an internal pressure to the plastic of the tube to obtain a final shape of the hollow body;
   bringing, after applying the internal pressure to the plastic of the tube, the tube into permanent contact with the sheathing on the projection to thereby obtain a permanent material connection between the plastic of the tube and the plastic material of the sheathing; and
   wrapping the hollow body with a fibre composite material.

* * * * *